J. W. MOIR & J. H. ELLIS.
FEED-REGULATOR FOR MILLSTONES.
No. 192,707. Patented July 3, 1877.
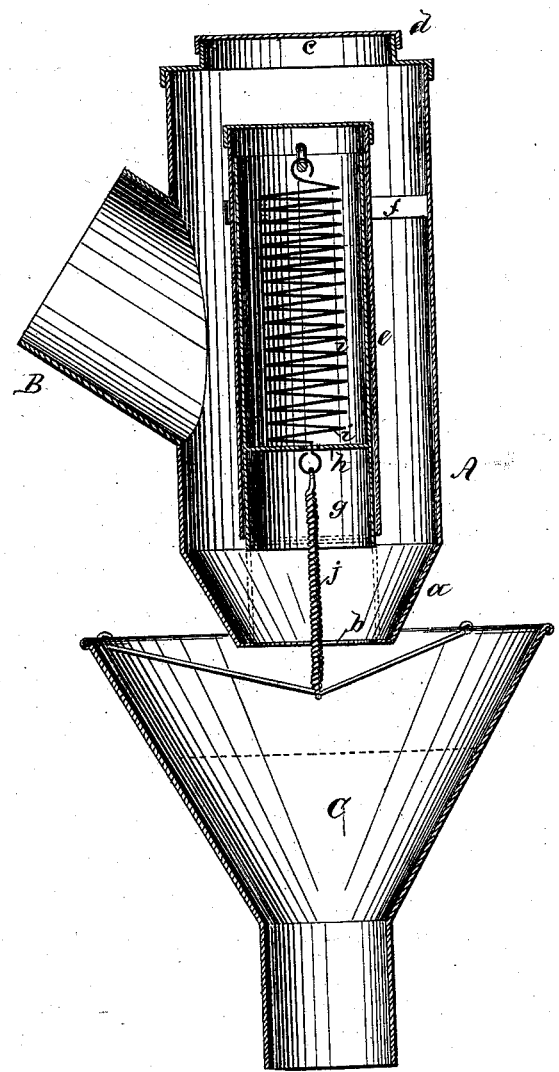
WITNESSES:
INVENTORS
BY
ATTORNEYS.

UNITED STATES PATENT OFFICE.

JAMES W. MOIR AND JAMES H. ELLIS, OF HALIFAX, NOVA SCOTIA, CANADA.

IMPROVEMENT IN FEED-REGULATORS FOR MILLSTONES.

Specification forming part of Letters Patent No. 192,707, dated July 3, 1877; application filed May 12, 1877.

*To all whom it may concern:*

Be it known that we, JAMES W. MOIR and JAMES H. ELLIS, of Halifax, in the Province of Nova Scotia and Dominion of Canada, have invented a new and Improved Feed-Regulator for Millstones, of which the following is a specification:

Our invention consists in the combination of a valve connected with the end of the grain-conduit, a spring for holding said valve open, and a hopper that is suspended from the valve, through which the grain passes to the hopper of the millstone; and the grain, by weighing down the said hopper, moves the valve so as to control the amount of grain passing through it.

The object of the invention is to provide a regulator for automatically controlling the supply of grain fed to the hopper of the millstone.

Referring to the drawing, which is a central vertical section of our improved regulator, A is a hollow metallic cylinder attached to the lower end of the grain-conduit B, and having a conical lower end, $a$, that is provided with an internal flange, $b$. The upper end of the cylinder A is provided with a head having an upwardly-projecting collar, $c$, to which a cap $d$ is fitted.

A tube, $e$, is supported centrally in the cylinder A by stays $f$, and within this tube a valve, $g$, is placed. This valve consists of a piece of tube having the head $h$, and containing the spring $i$, which is secured to a bar that extends across the upper end of the tube $e$. The lower end of the spring extends through the head $h$ in the valve, and is formed into an eye for receiving a hook, $j$, that is attached to the hopper C. This hopper is conical in form and of small dimensions, and is placed centrally in the hopper of the mill.

The operation is as follows: Grain is admitted to the apparatus through the conduit B, and as long as the supply is about equal to the amount ground by the stone, the parts of the regulator remain in their normal position; but when the supply is great the extra weight of grain in the hopper C carries it together with the valve downward, making the space between the valve $g$ and the internal flange $b$ less, cutting off the grain-supply.

When the grain becomes low in the mill-hopper it runs out of the hopper C, and in so doing makes the hopper lighter and permits the spring $i$ to open the valve.

Should the mill stop, or should the quantity of grain supplied become too great, the increased amount of grain in the hopper closes the valve down upon the flange $b$, thereby stopping the flow of grain.

The advantages claimed for our improvement are that an even feed of grain is always maintained, the feed being uninfluenced by the weight of grain in the garner.

The machine needs no attention, being entirely automatic in its operation, and it can be relied on for any sort of grain.

Having thus described my invention, I claim as new and desire to secure by Letters Patent—

The combination of the cylinder A, having the central tube $e$, the valve $g$, spring $i$, and hopper C, substantially as shown and described.

JAMES W. MOIR.
JAS. H. ELLIS.

Witnesses:
GEORGE MCNEVENS,
JAS W. CALDWELL.